(12) United States Patent
Park et al.

(10) Patent No.: US 12,578,588 B2
(45) Date of Patent: Mar. 17, 2026

(54) LENS DRIVING APPARATUS AND CAMERA MODULE INCLUDING THE SAME

(71) Applicant: SAMSUNG ELECTRO-MECHANICS CO., LTD., Suwon-si (KR)

(72) Inventors: Jaeman Park, Suwon-si (KR); Sanghun Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 561 days.

(21) Appl. No.: 17/982,736

(22) Filed: Nov. 8, 2022

(65) Prior Publication Data

US 2023/0213781 A1    Jul. 6, 2023

(30) Foreign Application Priority Data

Dec. 31, 2021    (KR) ......................... 10-2021-0194579

(51) Int. Cl.
| | |
|---|---|
| *G02B 27/64* | (2006.01) |
| *G03B 5/04* | (2021.01) |
| *H02K 41/035* | (2006.01) |

(52) U.S. Cl.
CPC ............. *G02B 27/646* (2013.01); *G03B 5/04* (2013.01); *H02K 41/0354* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

2021/0048729 A1*  2/2021  Yoon ...................... G03B 30/00
2022/0060610 A1*  2/2022  Sugiura ................... G03B 5/00

FOREIGN PATENT DOCUMENTS

| CN | 107888729 A | * | 4/2018 |
|---|---|---|---|
| JP | 2020-95216 A | | 6/2020 |
| KR | 10-2018-0135270 A | | 12/2018 |
| KR | 20180135270 A | * | 12/2018 |
| KR | 10-2020-0125571 A | | 11/2020 |
| KR | 10-2176824 B1 | | 11/2020 |

* cited by examiner

*Primary Examiner* — Shan Liu
(74) *Attorney, Agent, or Firm* — NSIP Law

(57) ABSTRACT

A lens driving apparatus includes a lens barrel, a carrier configured to accommodate the lens barrel, a focusing unit configured to move the carrier in an optical axis direction, and an image stabilizer unit configured to move the lens barrel in the carrier in a direction perpendicular to the optical axis direction, wherein the image stabilizer unit includes a lens holder to which the lens barrel is fixed, and a frame includes a body supporting the lens holder to guide movement of the lens barrel and having a side portion forming an outer rim, and a reinforcing member coupled to the side portion of the body, wherein the side portion extends along the outer rim of the frame, while the reinforcing member has a step portion formed in a cross-section perpendicular to the extending direction of the side portion.

20 Claims, 8 Drawing Sheets

LENS DRIVING APPARATUS AND CAMERA MODULE INCLUDING THE SAME

CROSS-REFERENCE TO RELATED APPLICATIONS

This application claims the benefit under 35 USC 119(a) of Korean Patent Application No. 10-2021-0194579, filed in the Korean Intellectual Property Office on Dec. 31, 2021, the entire disclosure of which is incorporated herein by reference for all purposes.

BACKGROUND

1. Field

The present disclosure relates to a lens driving apparatus and a camera module including the same.

2. Description of the Background

With remarkable development of information communication technology and semiconductor technology, distribution and use of electronic devices is rapidly increasing. These electronic devices tend to provide various functions by convergence rather than staying in their traditional unique domains.

Recently, a camera has been basically adopted in a portable electronic device such as a smartphone, a tablet PC, and a laptop computer, and an auto focus (AF) function, an image stabilizer (IS) function, and a zoom function may be added to the camera of this portable electronic device.

The image stabilizer (IS) function may include camera shake compensation and/or hand shake compensation, and an image of a photographed subject may be prevented from vibrating due to unintentional occurrence of hand shake or camera shake by a photographer when the camera is moving or stationary.

The auto focus (AF) function is to obtain a clear image from an imaging plane of an image sensor by moving a lens positioned in front of the image sensor along an optical axis direction depending on a distance from the subject.

As an electronic device on which a camera module is mounted becomes thinner, a thickness of the camera module also tends to become thinner, and in order to implement a thin camera module, a thickness of the components may be thin, and at the same time, high rigidity may also be desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens driving apparatus includes a lens barrel, a carrier configured to accommodate the lens barrel, a focusing unit configured to move the carrier in an optical axis direction, and an image stabilizer unit configured to move the lens barrel in the carrier in a direction perpendicular to the optical axis direction, wherein the image stabilizer unit includes a lens holder to which the lens barrel is fixed, and a frame including a body supporting the lens holder to guide movement of the lens barrel and having a side portion forming an outer rim, and a reinforcing member coupled to the side portion of the body, wherein the side portion extends along the outer rim of the frame, while the reinforcing member has a step portion formed in a cross-section perpendicular to the extending direction of the side portion.

The step portion may be formed on a first surface facing the lens holder from the side portion of the frame.

The step portion may be formed by form-fitting the body and the reinforcing member to each other.

The reinforcing member in the step portion may have a bent plate shape, and the body may have a step portion formed along the bent plate shape.

The step portion may include a central portion uplifted in a cross-section that is cut along a plane perpendicular to an extending direction of the body.

The reinforcing member in the step portion may be bent to have a raised plate shape, and the body may protrude along the raised plate shape.

The step portion may have a portion that is elongated from the side portion along an extending direction of the body.

The body may be made of a resin material, and the reinforcing member may be made of a non-magnetic metallic material.

The frame may be formed by insert injection-molding the body and the reinforcing member to be integrally coupled to each other.

A side portion of the frame may include a pair of edges parallel to each other and another pair of edges intersecting each other, and the step portion may be positioned in at least two side portions that intersect each other.

The side portion of the frame may include a pair of edges that intersect each other, and the step portion may be positioned on the pair of edges.

In another general aspect, a camera module includes a housing, and a lens driving apparatus mounted in the housing and configured to move a carrier accommodating a lens barrel in an optical axis direction or to move the lens barrel in the carrier in a direction perpendicular to the optical axis, wherein the lens driving apparatus includes a lens holder to which the lens barrel is fixed, and a frame including a body supporting the lens holder to guide movement of the lens barrel and having a side portion forming an outer rim, and a reinforcing member coupled to the side portion of the body, wherein the side portion extends along the outer rim of the frame, and the reinforcing member has a step portion formed in a cross-section perpendicular to the extending direction of the side portion.

In another general aspect, a lens driver includes a carrier movable along an optical axis direction, a frame movable in a first direction perpendicular to the optical axis direction and disposed on the carrier, a lens holder movable in a second direction perpendicular to the first direction and the optical axis direction and disposed on the frame, a lens barrel disposed on the lens holder, wherein the frame includes a body having a side portion extending along an outer rim of the frame, and a reinforcing member coupled to the side portion of the body, and wherein the reinforcing member includes a step portion when viewed in cross-section perpendicular to the extending direction of the side portion.

The lens driver may further include a focuser including a magnet disposed on the carrier and a coil facing the magnet.

The lens driver may further include an image stabilizer including a magnet disposed on the lens holder and a coil facing the magnet.

A camera module may include a housing, and the lens driver disposed in the housing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF THE EMBODIMENTS

Figure 1:
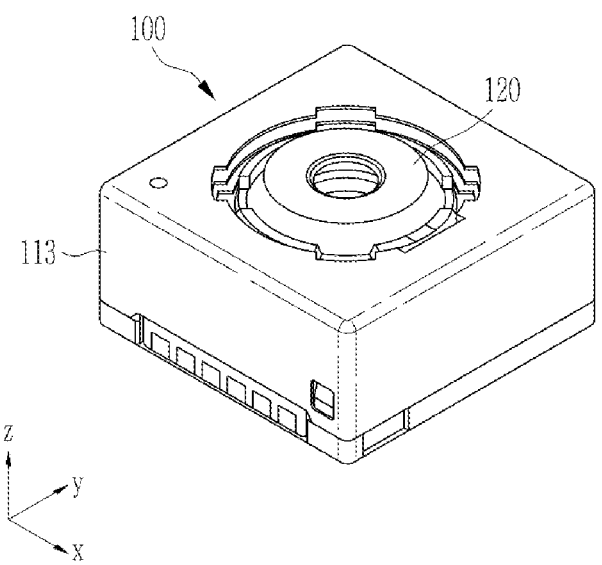
FIG. 1 illustrates a perspective view of a camera module according to an embodiment.

Hereinafter, while example embodiments of the present disclosure will be described in detail with reference to the accompanying drawings as follows, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, e.g., as to what an example or embodiment may include or implement, means that at least one example or embodiment exists in which such a feature is included or implemented while all examples and examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Further, throughout the specification, the phrase "in a plan view" means when an object portion is viewed from above, and the phrase "in a cross-sectional view" means when a cross-section taken by vertically cutting an object portion is viewed from the side.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

An aspect of the disclosed embodiment has been made in an effort to provide a lens driving apparatus and a camera module including the same, capable of maintaining a thin shape while having an image stabilization function, and securing a driving force for lens movement and rigidity of components even when configured in a thin shape.

However, the problem to be solved by the embodiments is not limited to the above-described problem, and can be variously extended within the scope of the technical spirit included in the present disclosure.

According to the lens driving apparatus of the embodiment, it is possible to maintain thinness while having an image stabilization function, and at the same time, to secure a driving force for lens movement and rigidity of components.

In addition, according to the camera module of the embodiment, it is possible to minimize a protruding portion even when it is mounted on a thin electronic device by providing a lens driving apparatus with high rigidity and a thin thickness.

Figure 2:
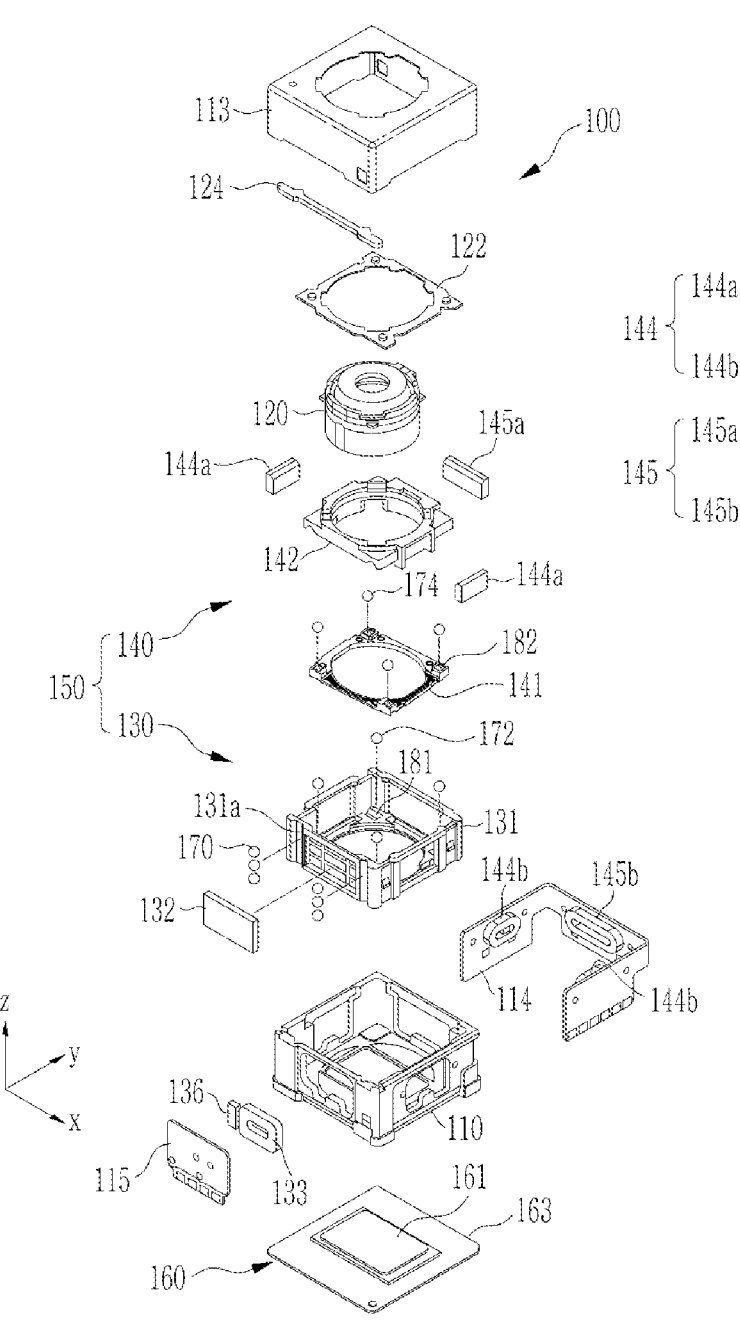
FIG. 2 illustrates an exploded perspective view schematically showing the camera module shown in FIG. 1.

FIG. 1 illustrates a perspective view of a camera module according to an embodiment, and FIG. 2 illustrates an exploded perspective view schematically showing the camera module shown in FIG. 1.

Referring to FIG. 1 and FIG. 2, the camera module 100 according to the present embodiment includes a lens barrel 120, a lens driving apparatus 150 configured to move the lens barrel 120, an image sensor unit 160 configured to convert light incident through the lens barrel 120 into an electrical signal, and a housing 110 and a cover 113 configured to accommodate the lens barrel 120 and the lens driving apparatus 150.

The lens barrel 120 may have a hollow cylindrical shape such that a plurality of lenses for imaging a subject may be accommodated therein, and the lenses are mounted on the lens barrel 120 along an optical axis. The lenses may be arranged at as many as necessary depending on a design of the lens barrel 120, and each of the lenses may have same or different optical properties such as refractive indexes.

The lens driving apparatus 150 is a device for moving the lens barrel 120, and includes a focusing unit 130 for adjusting a focus and an image stabilizer unit 140 for correcting shake. For example, the lens driving apparatus 150 may adjust a focus by moving the lens barrel 120 in an optical axis direction (z-axis direction in the drawing) using the focusing unit 130, and may correct shake during photographing by moving the lens barrel 120 in a direction that is perpendicular to the optical axis direction (x-axis and/or y-axis direction in the drawing) using the image stabilizer unit 140.

The focusing unit 130 includes a carrier 131 accommodating the lens barrel 120 and a focusing driver generating a driving force to move the lens barrel 120 and the carrier 131 in the optical axis direction. The focusing driver includes a magnet 132 and a coil 133.

For example, the magnet 132 may be mounted on a first surface of the carrier 131, and the coil 133 may be mounted on the housing 110 via a board 115. Herein, the magnet 132 is a moving member mounted on the carrier 131 and moving in the optical axis direction together with the carrier 131, and the coil 133 is a fixed member fixed to the housing 110. However, the present disclosure is not limited thereto, and positions of the magnet 132 and the coil 133 may be exchanged with each other.

When power is applied to the coil 133, the carrier 131 may be moved in the optical axis direction by an electromagnetic influence between the magnet 132 and the coil 133. Since the lens barrel 120 is accommodated in the carrier 131, the lens barrel 120 is also moved in the optical axis direction by movement of the carrier 131.

When the carrier 131 is moved, a rolling member 170 is positioned between the carrier 131 and the housing 110 to reduce friction between the carrier 131 and the housing 110.

The rolling member 170 may have a ball shape, and may be positioned at opposite sides of the magnet 132. A guide groove 131a may be formed in the carrier 131 such that the rolling member 170 may be accommodated and guided in the optical axis direction.

The focusing driver may use a closed-loop control method for detecting and feeding back a position of the lens barrel 120. For such closed loop control, a position sensor 136 may be required, and the position sensor 136 may be a Hall sensor. The position sensor 136 is positioned inside or outside the coil 133, and may be mounted on the board 115 on which the coil 133 is mounted.

The image stabilizer unit 140 is used to correct blurring of an image or shaking of a video due to factors such as user hand shake during image capture or video recording. For example, the image stabilizer unit 140 corrects the shake by imparting a relative displacement corresponding to a shake to the lens barrel 120 when the shake occurs during image capturing due to the user hand shake or the like. For example, the image stabilizer unit 140 corrects the shake by moving the lens barrel 120 in the x-axis and y-axis directions that are perpendicular to the optical axis direction.

The image stabilizer unit 140 includes a guide member for guiding movement of the lens barrel 120 and an image stabilizer driver for generating a driving force to move the guide member in a direction perpendicular to the optical axis direction.

The guide member includes a frame 141 and a lens holder 142. The frame 141 and the lens holder 142 are inserted into the carrier 131 to be positioned in the optical axis direction, and serve to guide the movement of the lens barrel 120.

The frame 141 and the lens holder 142 have a space into which the lens barrel 120 can be inserted, and the lens barrel 120 is fixed to the lens holder 142. The lens holder 142 may be provided to have a substantially rectangular frame shape, and the frame 141 may also have a rectangular frame shape corresponding thereto. Image stabilizer magnets 144a and 145a may be provided on three adjacent side surfaces of the lens holder 142.

The image stabilizer driver includes a first image stabilizer driver 144 and a second image stabilizer driver 145, and the first and second image stabilizer drivers 144 and 145 respectively include the magnets 144a and 145a and coils 144b and 145b.

The first image stabilizer driver 144 generates a driving force in a first axis direction (x-axis direction in the drawing) perpendicular to the optical axis direction, and the second image stabilizer driver 145 generates a driving force in a second axis direction (y-axis direction in the drawing) perpendicular to the first axial direction. Herein, a second axis (y-axis) indicates an axis perpendicular to both an optical axis (z-axis) and the first axis (x-axis). The first image stabilizer driver 144 and the second image stabilizer driver 145 may be positioned to be perpendicular to each other on a plane perpendicular to the optical axis.

The magnets 144a and 145a of the first and second image stabilizer drivers 144 and 145 are mounted on the lens holder 142, and the coils 144b and 145b respectively facing the magnets 144a and 145a are fixedly mounted to the housing 110 via a board 114.

The magnets 144a and 145a are moving members that are moved in a direction perpendicular to the optical axis direction together with the lens holder 142, and the coils 144b and 145b are fixed members fixed to the housing 110. However, the present disclosure is not limited thereto, and positions of the magnets 144a and 145a and the coils 144b and 145b may be respectively exchanged with each other.

Meanwhile, in the present embodiment, a plurality of ball members supporting the image stabilizer unit 140 are provided. The ball members function to guide the frame 141 and the lens holder 142 during an image stabilization process. In addition, they also function to maintain a distance between the carrier 131, the frame 141, and the lens holder 142.

The ball members include a first ball member 172 and a second ball member 174. The first ball member 172 guides movement in the first axis direction (x-axis direction) of the image stabilizer unit 140, and the second ball member 174 guides movement in the second axis direction (y-axis direction) of the image stabilizer unit 140.

For example, when a driving force in the first axis direction (x-axis direction) is generated, the first ball member 172 rolls in the first axis direction (x-axis direction). Accordingly, the first ball member 172 guides movement of the frame 141 and the lens holder 142 in the first axis direction (x-axis direction).

In addition, when a driving force in the second axis direction (y-axis direction) is generated, the second ball member 174 rolls in the second axis direction (y-axis direction). Accordingly, the second ball member 174 guides movement of the lens holder 142 in the second axis direction (y-axis direction).

The first ball member 172 includes a plurality of ball members positioned between the carrier 131 and the frame 141, and the second ball member 174 includes a plurality of ball members positioned between the frame 141 and the lens holder 142.

A first guide groove portion 181 for accommodating the first ball member 172 is formed on a surface on which the carrier 131 and the frame 141 face each other in the optical axis direction (z-axis direction). The first guide groove portion 181 includes a plurality of guide grooves.

The first ball member 172 is accommodated in the first guide groove portion 181, to be inserted between the carrier 131 and the frame 141. While the first ball member 172 is accommodated in the first guide groove portion 181, movement in the optical axis direction (z-axis direction) and the second axis direction (y-axis direction) may be limited, and movement may be performed only in the first axis direction (x-axis direction).

A second guide groove portion 182 for accommodating the second ball member 174 is formed on a surface on which the frame 141 and the lens holder 142 face each other in the optical axis direction (z-axis direction). The second guide groove portion 182 includes a plurality of guide grooves.

The second ball member 174 is accommodated in the second guide groove portion 182, to be inserted between the frame 141 and the lens holder 142. While the second ball member 174 is accommodated in the second guide groove portion 182, movement in the optical axis direction (z-axis direction) and the first axis direction (x-axis direction) may be limited, and movement may be performed only in the second axis direction (y-axis direction). To this end, a planar shape of each of the guide grooves of the second guide groove portion 182 is a rectangle in which a length in the second axis direction (y-axis direction) is longer than a width in the first axis direction (x-axis direction).

The image sensor unit 160 is a device that converts light incident through the lens barrel 120 into an electrical signal. For example, the image sensor unit 160 may include an image sensor 161 and a printed circuit board 163 connected to the image sensor 161, and may further include an infrared filter. The infrared filter serves to block light in an infrared region among light incident through the lens barrel 120.

The image sensor 161 converts light incident through the lens barrel 120 into an electrical signal. For example, the image sensor 161 may be a charge coupled device (CCD) or a complementary metal-oxide semiconductor (CMOS). The electrical signal converted by the image sensor 161 is outputted as an image through a display unit of a portable electronic device. The image sensor 161 may be fixed to the printed circuit board 163, and may be electrically connected to the printed circuit board 163.

The lens barrel 120 and the lens driving device 150 are accommodated in an inner space of the housing 110, and for example, the housing 110 may have a box shape with an open top and an open bottom. The image sensor unit 160 is positioned under the housing 110.

Meanwhile, a stopper 122 may be further positioned on an upper portion of the lens barrel 120 to prevent separation of the frame 141 and the lens holder 142 from the inner space of the carrier 131, and the stopper 122 may be coupled to the carrier 131. In addition, a ball stopper 124 may be mounted on the carrier 131 to cover the guide groove 131a of the carrier 131. Separation of the moving rolling member 170 may be blocked by being accommodated in the guide groove 131a of the carrier 131 by the ball stopper 124.

The cover 113 is coupled to the housing 110 so as to surround an outer surface of the housing 110, and functions to protect internal components of the camera module. In addition, the cover 113 may function to block an electromagnetic wave. For example, the cover 113 may shield the electromagnetic wave such that the electromagnetic wave generated by the camera module does not affect other electronic components in a portable electronic device.

In addition, since various electronic components are mounted in the portable electronic device in addition to the camera module, the cover 113 may block electromagnetic waves generated from these electronic components such that they do not affect the camera module. The cover 113 may be provided as a metal material to be grounded to a grounding pad provided on the printed circuit board 163, thereby blocking the electromagnetic waves.

Figure 3:
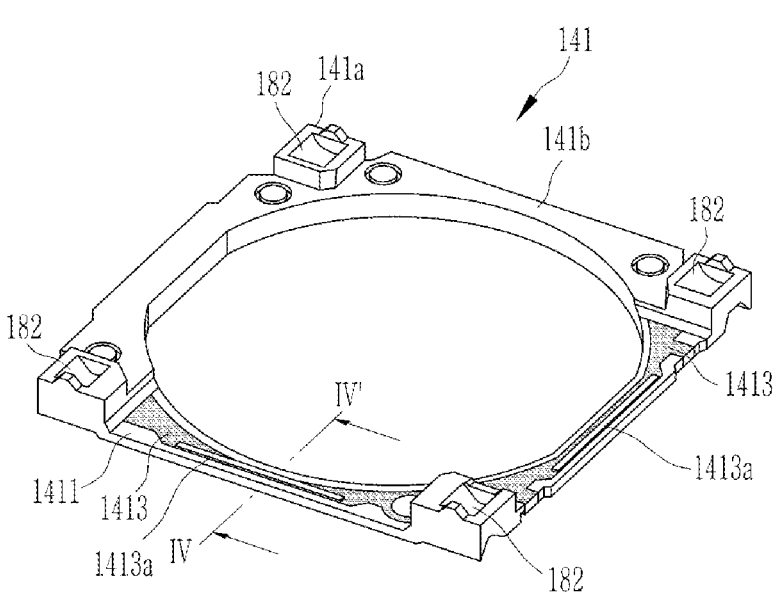
FIG. 3 illustrates a perspective view showing one frame of the camera module shown in FIG. 1.
Figure 4:
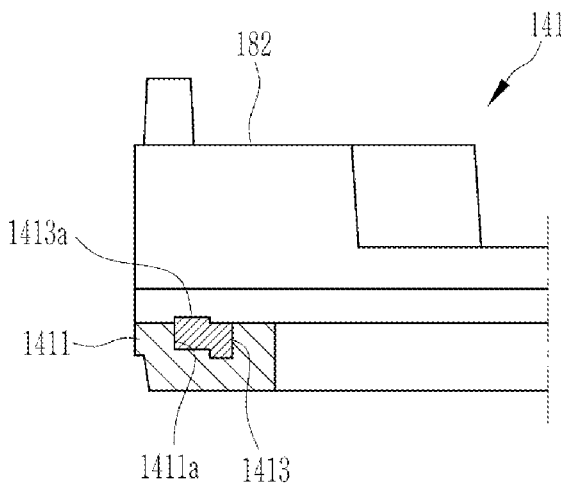
FIG. 4 illustrates a cross-sectional view taken along a line IV-IV of FIG. 3.

FIG. 3 illustrates a perspective view showing one frame of the camera module shown in FIG. 1, and FIG. 4 illustrates a cross-sectional view taken along a line IV-IV' of FIG. 3.

Referring to FIG. 3 and FIG. 4, the frame 141 according to the present embodiment has an approximately circular penetration hole formed in a center and has an approximately rectangular outer rim shape, and as described above, the lens holder 142 is supported thereon with the second ball member 174 therebetween to guide movement of the lens barrel 120 in a direction perpendicular to the optical axis.

The frame 141 according to the present embodiment includes a body 1411 having first strength and a reinforcing member 1413 having second strength greater than the first strength.

The body 1411 may be formed by injection molding with a resin material to form a basic appearance of the frame 141. Accordingly, the frame 141 may include a corner portion 141a positioned at each corner of a rectangle to form the second guide groove 182, and side portion 141b that connects them along four sides of the frame 141 and forms an outer rim, while the body 1411 may constitute a corner portion 141a and a side portion 141b.

The reinforcing member 1413 may be molded in close contact with the body 1411 at the side portion 141b of the frame 141, and may be processed by, e.g., an insert molding method. The body 1411 is formed to have a shape that is elongated from the side portion 141b of the frame 141, and the reinforcing member 1413 may extend from at least some of the side portions 141*b* along the side portions 141*b* to be coupled to the body 1411. In this case, strength of the reinforcing member 1413 is greater than that of the body 1411, for example, the reinforcing member 1413 may be made of a metallic material, and the metallic material may be a non-magnetic material.

As illustrated in FIG. 4, the body 1411 constituting the frame 141 may include a groove 1411*a* recessed inward from a surface at a center in a width direction when viewed from a cross-section perpendicular to an extending direction of the side portion 141*b*. The reinforcing member 1413 may be coupled to the body 1411 while being accommodated in the groove 1411*a* of the body 1411.

In the present embodiment, the reinforcing member 1413 and the body 1411 constituting the frame 141 may form a step portion 1413*a* on a first surface thereof facing the lens holder 142 from the side portion 141*b*. The step portion 1413*a* may be formed by enabling the body 1411 and the reinforcing member 1413 to be form-fitted to each other. That is, the body 1411 of the frame 141 may be formed to have a step in a cross-section that is cut along a plane perpendicular to the extending direction of the side portion 141*b*, and the reinforcing member 1413 is bent together along the step of the body 1411 to form the step portion 1413*a*. The step portion 1413*a* may have a step having an angled edge.

When the reinforcing member 1413 is accommodated in the groove 1411*a* of the body 1411, a step may be formed on a bottom surface of the groove 1411*a* and the reinforcing member 1413 may be bent to be form-fitted to the step of the bottom surface to form the step portion 1413*a*. The step portion 1413*a* formed in this way may partially protrude from a surface of the body 1411.

The step portion 1413*a* may extend long along the side portion 141*b* of the frame 141. Accordingly, in the step portion 1413*a*, the reinforcing member 1413 may have a bent plate shape. In addition, the step portion 1413*a* may be positioned at a portion where the reinforcing member 1413 is positioned, and may be selectively formed singularly or in a plurality among the four side portions 141*b* constituting the frame 141. In the present embodiment, the frame 141 includes a pair of edges that are parallel to each other and another pair of edges that intersect each other, and the reinforcing member 1413 may be positioned on at least two edges that intersect each other. Accordingly, the step portion 1413*a* may be formed in two adjacent side portions 141*b* that share a corner with each other. In this case, the reinforcing member 1413 and the step portion 1413*a* may be formed in the relatively thin side portion 141*b*.

As described above, since the reinforcing member 1413 having the step portion 1413*a* is formed on the side portion 141*b* of the frame 141, deformation of the frame 141 may be prevented. That is, the step portion 1413*a* of the reinforcing member 1413 may have a form in which a bead is added in a direction opposite to an expected deformation direction of the frame 141 to secure rigidity against deformation. Accordingly, it is also advantageous to secure performance of the image stabilizer unit 140 including the frame 141 as one component.

Figure 5:
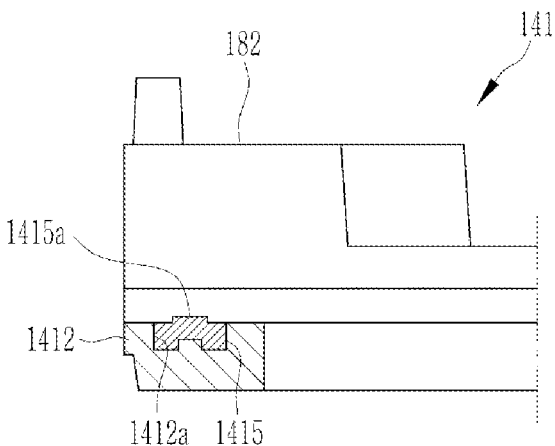
FIG. 5 illustrates a cross-sectional view showing one frame of a camera module according to another embodiment.

FIG. 5 illustrates a cross-sectional view showing one frame of a camera module according to another embodiment.

A frame 141' shown in FIG. 5 is different from the frame 141 shown in FIG. 4 in shapes of the reinforcing member 1415 and the step portion 1415*a*, and accordingly, a shape of the groove 1412*a* formed in the body 1412 is formed to match a shape of the reinforcing member 1415. Hereinafter, only other parts will be described, and parts not described may have a same structure as those of the frame 141 illustrated in FIG. 3 and FIG. 4.

Referring to FIG. 5, in the present embodiment, the step portion 1415*a* may be formed by allowing a central portion to be uplifted in a cross-section that is cut along a plane perpendicular to the extending direction of the body 1412. That is, when the reinforcing member 1415 is accommodated in the groove 1412*a* of the body 1412, an upward protrusion may be formed in a center of the bottom surface of the groove 1412*a* and the reinforcing member 1415 may be bent to be form-fitted into the protrusion of the bottom surface to form a step portion 1415*a*. The step portion 1415*a* formed in this way may partially protrude from a surface of the body 1412.

Figure 6:
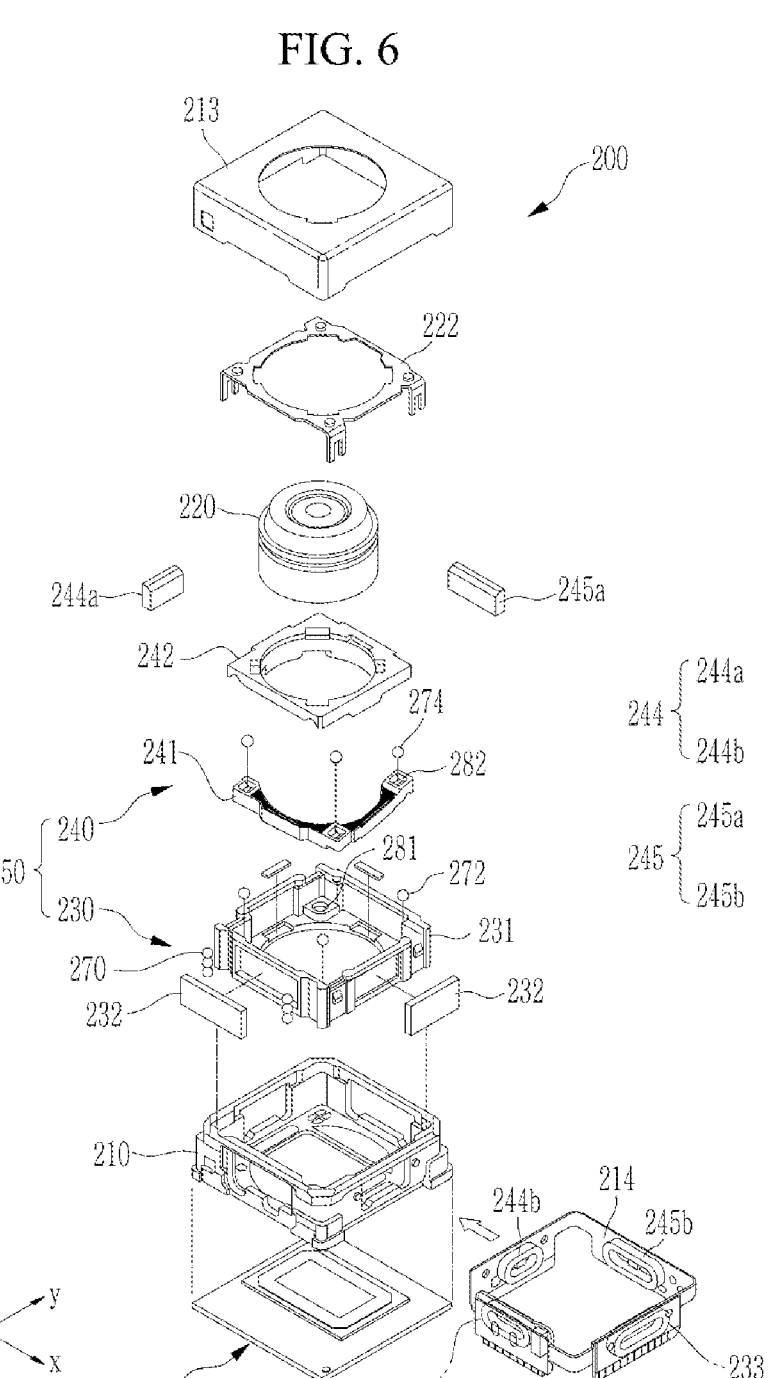
FIG. 6 illustrates a perspective view of a camera module according to still another embodiment.

FIG. 6 illustrates a perspective view of a camera module according to still another embodiment.

Referring to FIG. 6, the camera module 200 according to the present embodiment includes a lens barrel 220, a lens driving apparatus 250 configured to move the lens barrel 220, an image sensor unit 260 configured to convert light incident through the lens barrel 220 into an electrical signal, and a housing 210 and a cover 213 configured to accommodate the lens barrel 220 and the lens driving apparatus 250.

The lens driving apparatus 250 is a device for moving the lens barrel 220, and includes a focusing unit 230 for adjusting a focus and an image stabilizer unit 240 for correcting shake.

The focusing unit 230 includes a carrier 231 accommodating the lens barrel 220 and a focusing driver generating a driving force to move the lens barrel 220 and the carrier 231 in the optical axis direction. The focusing driver includes a magnet 232 and a coil 233. For example, the magnet 232 may be mounted on a first surface of the carrier 231, and the coil 233 may be mounted on the housing 210 via a board 214.

The image stabilizer unit 240 includes a guide member for guiding movement of the lens barrel 220 and an image stabilizer driver for generating a driving force to move the guide member in a direction perpendicular to the optical axis direction. The guide member includes a frame 241 and a lens holder 242. The frame 241 and the lens holder 242 are inserted into the carrier 231 to be positioned in the optical axis direction, and serve to guide the movement of the lens barrel 220.

The lens holder 242 may be provided to have a substantially rectangular frame shape, and the frame 241 may be provided in an L-shape from which a diagonal half of the rectangular frame is removed. Image stabilizer magnets 244*a* and 245*a* may be provided on two adjacent side surfaces of the lens holder 242. A stopper 222 may be further positioned on an upper portion of the lens barrel 220 to prevent separation of the frame 241 and the lens holder 242 from the inner space of the carrier 231, and the stopper 222 may be coupled to the carrier 231.

The image stabilizer driver includes a first image stabilizer driver 244 and a second image stabilizer driver 245, and the first and second image stabilizer drivers 244 and 245 respectively include the magnets 244*a* and 245*a* and coils 244*b* and 245*b*. The magnets 244*a* and 245*a* of the first and second image stabilizer drivers 244 and 245 are mounted on the lens holder 242, and the coils 244*b* and 245*b* respectively facing the magnets 244*a* and 245*a* are fixedly mounted to the housing 210 via the board 214.

Meanwhile, in the present embodiment, a plurality of ball members supporting the image stabilizer unit 240 are provided. The ball members function to guide the frame 241 and the lens holder 242 during an image stabilization process. In addition, they also function to maintain a distance between the carrier 231, the frame 241, and the lens holder 242.

The ball members include a first ball member 272 and a second ball member 274. The first ball member 272 includes a plurality of ball members positioned between the carrier 231 and the frame 241 to guide movement of the image stabilizer unit 240 in a first axis direction (x-axis direction), and the second ball member 274 includes a plurality of ball members positioned between the frame 241 and the lens holder 242 to guide movement of the image stabilizer unit 240 in a second axis direction (y-axis direction).

A first guide groove portion 281 for accommodating the first ball member 272 is formed on a surface on which the carrier 231 and the frame 241 face each other in the optical axis direction (z-axis direction). A second guide groove portion 282 for accommodating the second ball member 274 is formed on a surface on which the frame 241 and the lens holder 242 face each other in the optical axis direction (z-axis direction).

Figure 7:
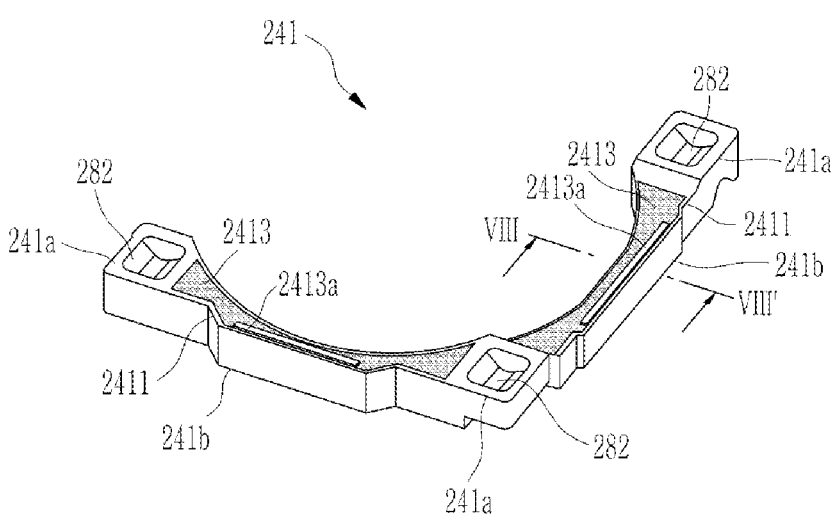
FIG. 7 illustrates a perspective view showing one frame of the camera module shown in FIG. 6.
Figure 8:
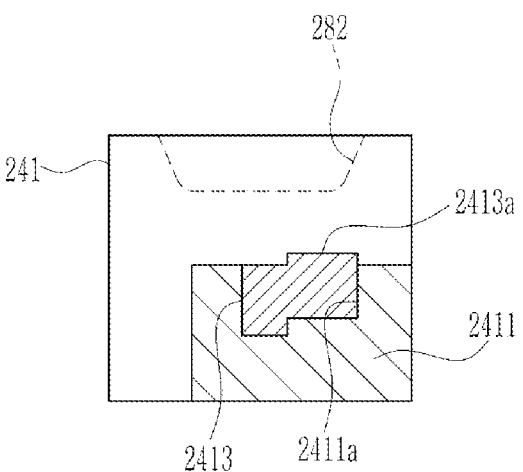
FIG. 8 illustrates a cross-sectional view taken along a line VIII-VIII' of FIG. 7.

FIG. 7 illustrates a perspective view showing one frame of the camera module shown in FIG. 6, and FIG. 8 illustrates a cross-sectional view taken along a line VIII-VIII' of FIG. 7.

Referring to FIG. 7 and FIG. 8, the frame 241 according to the present embodiment may have an approximately L-shaped outer rim, and an inner side corresponding to a position of the lens barrel 220 may be formed to have an approximately arc-shaped round portion that is a part of a circle. As described above, the frame 241 is configured to support the lens holder 242 with the second ball member 274 therebetween to guide movement in a direction that is perpendicular to the optical axis of the lens barrel 220.

The frame 241 according to the present embodiment includes a body 2411 having first strength and a reinforcing member 2413 having second strength that is greater than the first strength.

The body 2411 may be formed by injection molding with a resin material to form a basic appearance of the frame 241. Accordingly, the frame 241 may include three corner portions 241a positioned at three corners of a rectangle to form the second guide groove portion 282, and two side portions 241b that connect them to each other and form an outer rim, while the body 2411 may constitute a corner portion 241a and a side portion 241b. That is, the frame 241 having an L-shape may include two side portions 241b orthogonal to each other, an intersection formed by the two side portions 241b meeting, and three corner portions 241a positioned at free ends of the two side portions 241b.

The reinforcing member 2413 may be molded in close contact with the body 2411 at the side portion 241b of the frame 241, and may be processed by, e.g., an insert injection method. The body 2411 is formed to have a shape that is elongated from the side portion 241b of the frame 241, and the reinforcing member 2413 may extend from at least some of the side portions 241b along the side portions 241b to be coupled to the body 2411. In this case, strength of the reinforcing member 2413 is greater than that of the body 2411, for example, the reinforcing member 2413, may be made of a metallic material, and the metallic material may be a non-magnetic material.

In the present embodiment, the reinforcing member 2413 and the body 2411 constituting the frame 241 may form a step portion 2413a on a first surface thereof facing the lens holder 242 from the side portion 241b. The step portion 2413a may be formed by enabling the body 2411 and the reinforcing member 2413 to be form-fitted into each other. That is, the body 2411 of the frame 241 may be formed to have a step in a cross-section that is cut along a plane perpendicular to the extending direction of the side portion 241b, and the reinforcing member 2413 is bent together along the step of the body 2411 to form the step portion 2413a. The step portion 2413a may have a step having an angled edge.

The step portion 2413a may extend long along the side portion 241b of the frame 241. Accordingly, in the step portion 2413a, the reinforcing member 2413 may be bent to have a raised plate shape. In addition, the step portion 2413a may be positioned at a portion where the reinforcing member 2413 is positioned, and may be selectively formed singularly or in a plurality among the two side portions 241b constituting the frame 241.

In the present embodiment, the frame 241 includes a pair of edges that cross each other, and the reinforcing member 2413 may be positioned on the pair of edges. Accordingly, the step portion 2413a may be formed in two adjacent side portions 241b that share a corner with each other.

Referring to FIG. 8, the body 2411 may include a groove 2411a recessed inward from a surface in a center in a width direction, and the reinforcing member 2413 may be coupled to the body 2411 while being accommodated in the groove 2411a of the body 2411. When the reinforcing member 2413 is accommodated in the groove 2411a of the body 2411, a step may be formed on a bottom surface of the groove 2411a and the reinforcing member 2413 may be bent to be form-fitted into the step of the bottom surface to form the step portion 2413a. The step portion 2413a formed in this way may partially protrude from a surface of the body 2411.

In addition, as described with reference to FIG. 5, as another example, the step portion may be formed by allowing a central portion to be uplifted in a cross-section that is cut along a plane perpendicular to an extending direction of a body thereof. That is, when the reinforcing member is accommodated in a groove of the body, an upward protrusion may be formed in a center of a bottom surface inside the groove, and the reinforcing member may be bent to be form-fitted into the protrusion of the bottom surface to form a step portion.

As described above, since the reinforcing member 2413 having the step portion 2413a is formed on the side portion 241b of the frame 241, deformation of the frame 241 may be prevented. That is, the step portion 2413a of the reinforcing member 2413 may have a form in which a bead is added in a direction opposite to an expected deformation direction of the frame 241 to secure rigidity against deformation. Accordingly, it is also advantageous to secure performance of the image stabilizer unit 240 including the frame 241 as one component.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens driving apparatus comprising:
a lens barrel;
a carrier in which the lens barrel is disposed;
a focusing unit configured to move the carrier in an optical axis direction; and
an image stabilizer unit configured to move the lens barrel relative to the carrier in a direction perpendicular to the optical axis direction,
wherein the image stabilizer unit comprises:
a lens holder in which the lens barrel is disposed; and
a frame comprising a body supporting the lens holder to guide movement of the lens barrel, the body comprising two corner portions disposed on one side of the frame, and a side portion extending in a length direction between the two corner portions, the frame further comprising a reinforcing member coupled to the side portion extending between the two corner portions, and
a cross section of the reinforcing member disposed halfway between the two corner portions is parallel to the optical axis direction and perpendicular to the length direction and comprises a step portion.

2. The lens driving apparatus of claim 1, wherein the step portion protrudes from a surface of the side portion facing the lens holder.

3. The lens driving apparatus of claim 1, wherein the step portion is formed by form-fitting the body and the reinforcing member to each other.

4. The lens driving apparatus of claim 1, wherein the reinforcing member has a bent plate shape forming the step portion, and the side portion comprises a step portion formed along the bent plate shape.

5. The lens driving apparatus of claim 1, wherein a central portion of the step portion protrudes from a surface of the side portion.

6. The lens driving apparatus of claim 5, wherein the reinforcing member has a bent raised plate shape forming the step portion.

7. The lens driving apparatus of claim 1, wherein the reinforcing member is elongated in the length direction in which the side portion extends.

8. The lens driving apparatus of claim 1, wherein the body is made of a resin material, and
the reinforcing member is made of a non-magnetic metallic material.

9. The lens driving apparatus of claim 1, wherein the frame is formed by insert injection molding the body and the reinforcing member to be so that the body and the reinforcing member are integrally coupled to each other.

10. The lens driving apparatus of claim 1, wherein the body comprises four corner portions,
the side portion comprises four sections connecting the four corner portions to each other, and
the reinforcing member is disposed on two sections of the side portion connected to one of the corner portions.

11. The lens driving apparatus of claim 1, wherein the body comprises three corner portions,
the side portion comprises two sections connecting the three corner portions to each other, and
the reinforcing member is disposed on the two sections of the side portion.

12. A camera module comprising:
a housing; and
a lens driving apparatus disposed in the housing and configured to move a carrier in which a lens barrel is disposed in an optical axis direction or to move the lens barrel relative to the carrier in a direction perpendicular to the optical axis,
wherein the lens driving apparatus comprises:
a lens holder in which the lens barrel is disposed; and
a frame comprising a body supporting the lens holder to guide movement of the lens barrel, the body comprising two corner portions disposed on one side of the frame, and a side portion extending in a length direction between the two corner portions, the frame further comprising a reinforcing member coupled to the side portion extending between the two corner portions, and
a cross section of the reinforcing member disposed halfway between the two corner portions is parallel to the optical axis direction and perpendicular to the length direction and comprises a step portion.

13. The camera module of claim 12, wherein the step portion protrudes from a surface of the side portion facing the lens holder.

14. The camera module of claim 12, wherein the reinforcing member has a bent plate shape forming the step portion, and the side portion comprises a step portion formed along the bent plate shape.

15. The camera module of claim 12, wherein a central portion of the step portion protrudes from a surface of the side portion.

16. The camera module of claim 12, wherein the reinforcing member is elongated in the length direction in which the side portion extends.

17. A lens driver comprising:
a carrier configured to be movable in an optical axis direction;
a frame disposed on the carrier and configured to be movable in a first direction perpendicular to the optical axis direction;
a lens holder disposed on the frame and configured to be movable in a second direction perpendicular to the first direction and the optical axis direction; and
a lens barrel disposed on the lens holder,
wherein the frame comprises a body comprising two corner portions disposed on one side of the frame, and a side portion extending in a length direction between the two corner portions, the frame further comprising a reinforcing member coupled to the side portion extending between the two corner portions, and
a cross section of the reinforcing member disposed halfway between the two corner portions is parallel to the optical axis direction and perpendicular to the length direction and comprises a step portion.

18. The lens driver of claim 17, further comprising a focuser comprising a magnet disposed on the carrier, and a coil facing the magnet.

19. The lens driver of claim 17, further comprising an image stabilizer comprising a magnet disposed on the lens holder, and a coil facing the magnet.

20. A camera module comprising:
a housing; and
the lens driver of claim 17 disposed in the housing.

* * * * *